US007165009B2

(12) United States Patent
Frank et al.

(10) Patent No.: US 7,165,009 B2
(45) Date of Patent: Jan. 16, 2007

(54) APPARATUS, METHOD AND ARTICLES OF MANUFACTURE FOR VELOCITY AND BEARING DETERMINATION OF AN OBJECT

(75) Inventors: Christian Rudolf Herbert Frank, Schweinfurt (DE); Dirk Klotzbücher, Würzburg (DE); Walter Poiger, Bad Neustadt (DE)

(73) Assignee: Tyco Electronics AMP GmbH, Bensheim (DE)

( * ) Notice: Subject to any disclaimer, the term of this patent is extended or adjusted under 35 U.S.C. 154(b) by 180 days.

(21) Appl. No.: 10/916,323

(22) Filed: Aug. 11, 2004

(65) Prior Publication Data

US 2005/0060119 A1    Mar. 17, 2005

Related U.S. Application Data

(63) Continuation-in-part of application No. 10/663,102, filed on Sep. 16, 2003, now Pat. No. 6,911,934.

(51) Int. Cl.
*G01B 11/02* (2006.01)
(52) U.S. Cl. ..................................................... 702/143
(58) Field of Classification Search ................ 702/143, 702/39, 48, 54, 103; 342/104; 367/89
See application file for complete search history.

(56) References Cited

U.S. PATENT DOCUMENTS

| | | | | |
|---|---|---|---|---|
| 2,946,049 A | * | 7/1960 | Stotz | 342/77 |
| 3,274,590 A | * | 9/1966 | Page | 342/80 |
| 3,460,140 A | * | 8/1969 | Logan | 342/157 |
| 4,006,478 A | * | 2/1977 | Lewis et al. | 342/15 |
| 4,035,760 A | * | 7/1977 | Asbury et al. | 367/90 |
| 4,219,812 A | * | 8/1980 | Rittenbach | 342/110 |
| 4,430,655 A | * | 2/1984 | Rittenbach | 342/155 |
| 4,717,916 A | | 1/1988 | Adams et al. | 324/107 |
| 5,093,666 A | * | 3/1992 | Jamison | 342/150 |
| 5,731,778 A | | 3/1998 | Nakatani et al. | 324/70 |

(Continued)

FOREIGN PATENT DOCUMENTS

EP    0919 835 A2 *  6/1999

(Continued)

OTHER PUBLICATIONS

Reed J C: "Side zone automotive radar" Radar Conference, 1997., IEEE National Syracuse, NY, USA May 13-15, 1997, New York, NY, USA, IEEE, US, May 13, 1997, pp. 186-190, XPO10224762 ISBN: 0-7803-3731-X.

*Primary Examiner*—Bryan Bui
*Assistant Examiner*—Tung S. Lau (57) ABSTRACT

A sensor front end is disclosed that is able to discriminate objects based on their range from the sensor and to derive bearing information therefrom. The sensor system includes a signal source for transmitting at least a first and a second sensor signal toward the object and receiving a first and a second reflected signal pulse therefrom, and for generating a first and second information signal based on the first and the second reflected signals, respectively; and an information processor programmed to receive the first and second information signal from the signal source and to determine bearing information for the object based on a phase difference between the first and second information signal. The information processor is preferably capable of generating sample points from the first and second information signal and calculating the bearing information using these sample points.

22 Claims, 6 Drawing Sheets

U.S. PATENT DOCUMENTS

| | | | |
|---|---|---|---|
| 5,966,092 A | 10/1999 | Wagner et al. | 342/70 |
| 6,381,261 B1 * | 4/2002 | Nagazumi | 375/138 |
| 6,639,543 B1 | 10/2003 | Puglia | 342/70 |
| 6,720,908 B1 | 4/2004 | Puglia | 342/70 |
| 6,825,797 B1 * | 11/2004 | Ishii et al. | 342/70 |
| 6,839,017 B1 * | 1/2005 | Dillman | 342/16 |
| 2003/0128153 A1 | 7/2003 | Paradie et al. | 342/70 |

FOREIGN PATENT DOCUMENTS

EP   1 321 776   6/2003

* cited by examiner

APPARATUS, METHOD AND ARTICLES OF MANUFACTURE FOR VELOCITY AND BEARING DETERMINATION OF AN OBJECT

CROSS REFERENCE TO RELATED APPLICATIONS

This application is a continuation-in-part of U.S. patent application Ser. No. 10/663,102 filed Sep. 16, 2003 now U.S. Pat. No. 6,911,934.

FIELD OF THE INVENTION

The field of the invention concerns systems for determining bearing and velocity information for an object using phase discriminating radar, and more particularly to apparatus, methods, and articles of manufacture for determining bearing and velocity information for an object from the phase difference between two or more radar signals reflected from the object.

BACKGROUND OF THE INVENTION

Proximity sensors of various types are used in a variety of applications in which the distance to an object and, in some circumstances, the velocity of that object relative to the sensor are to be determined. This data can be provided to a processing system that analyzes the received data and determines if a safety threshold has been exceeded. If a safety threshold has been exceeded, the processor can determine if an alarm is to be set or other action taken. Proximity sensors are used, for example, in a variety of applications that can include burglar alarms, obstacle detectors, and automobiles. Proximity sensors in automobiles can be used to determine the relative position and relative velocity of other automobiles or objects in the vicinity of the automobile. In an automobile system this position and velocity data may be used, for example, to adjust the velocity of the automobile while operating under cruise control, to apply a portion of the available brake energy to slow the vehicle down, or to provide an auditory or visual alarm indication to the driver.

It is also beneficial in these systems to be able to determine the bearing at which the object is approaching the automobile. The sensor must also be physically small, lightweight, highly reliable, and low cost. The system requirements for these sensors are often quite stringent both in terms of the technical performance of the sensor and in the physical and economic factors as well. The more complex the sensor, the larger the parts count, and concomitantly, the higher the cost, the higher the mass, the larger the physical volume of the sensor, and the lower the reliability of the sensor.

Therefore, it would be advantageous to provide a sensor system that is able to discriminate between objects that are within a specified range and objects that are outside of this range, and that is able to determine the bearing at which these objects are approaching the automobile.

BRIEF SUMMARY OF THE INVENTION

Embodiments of the invention include a sensor front-end system that is able to discern objects based on their range from the sensor. The sensor system preferably includes a signal source for transmitting at least a first and second sensor signal pulse toward the object and receiving a first and second reflected signal pulse therefrom, and for generating a first and second information signal, respectively, based thereon; and an information processor programmed to receive the first and second information signal from the signal source and to determine bearing information for the object based on a phase difference between the first and second information signal. The information processor is preferably capable of generating sample points from the first and second information signal and calculating the bearing information using these sample points.

The signal source preferably includes at least two antennas that transmit the sensor signals and, if an object is present, receives the reflected signals therefrom. A pulsed oscillator may be used that provides a pulsed signal having a frequency and phase, with a predetermined pulse duration and with a predetermined pulse repetition frequency. The pulsed oscillator preferably provides the pulsed signal to two dual mode mixers that are each coupled to the antennas. In addition, the dual mode mixers preferably use a portion of the signal to mix with the received reflected signal and provide the information signals. The dual mode mixer thus provides a signal output if the received reflected signal is present in the dual mode mixer concurrently with the pulsed signal. Accordingly, an object can only be detected when the range to the object is such that the signal propagation time to and from the object is less than or equal to the predetermined pulse length of the pulsed first signal.

Other forms, features and aspects of the above-described methods and system are described in the detailed description that follows.

BRIEF DESCRIPTION OF THE DRAWINGS

The invention will be more fully understood from the following detailed description taken in conjunction with the accompanying drawings in which.

DETAILED DESCRIPTION OF THE INVENTION

A sensor front-end system is disclosed that is able to discriminate between objects within a specified range and objects outside of that specified range and that has a reduced number of parts when compared to current sensors. In particular, the sensor front end incorporates a pulse signal source that provides a pulsed first signal to a dual mode mixer. The dual mode mixer transmits a portion of the pulsed first signal from an antenna as the sensor signal. The dual mode mixer further uses a portion of the pulsed first signal as a local oscillator to down convert the received reflected signal by mixing the pulsed first signal therewith and therein forming a base-band signal. These down converted signals are then processed and provided as a sensor output signal. Thus, an object will only be detected if the pulsed first signal and the reflected signal are present concurrently in the dual mode mixer. Thus, to be detected an object must have a range such that the total propagation time to and from the object is less than the pulse width of the signal provided by the pulsed oscillator.

Figure 1:
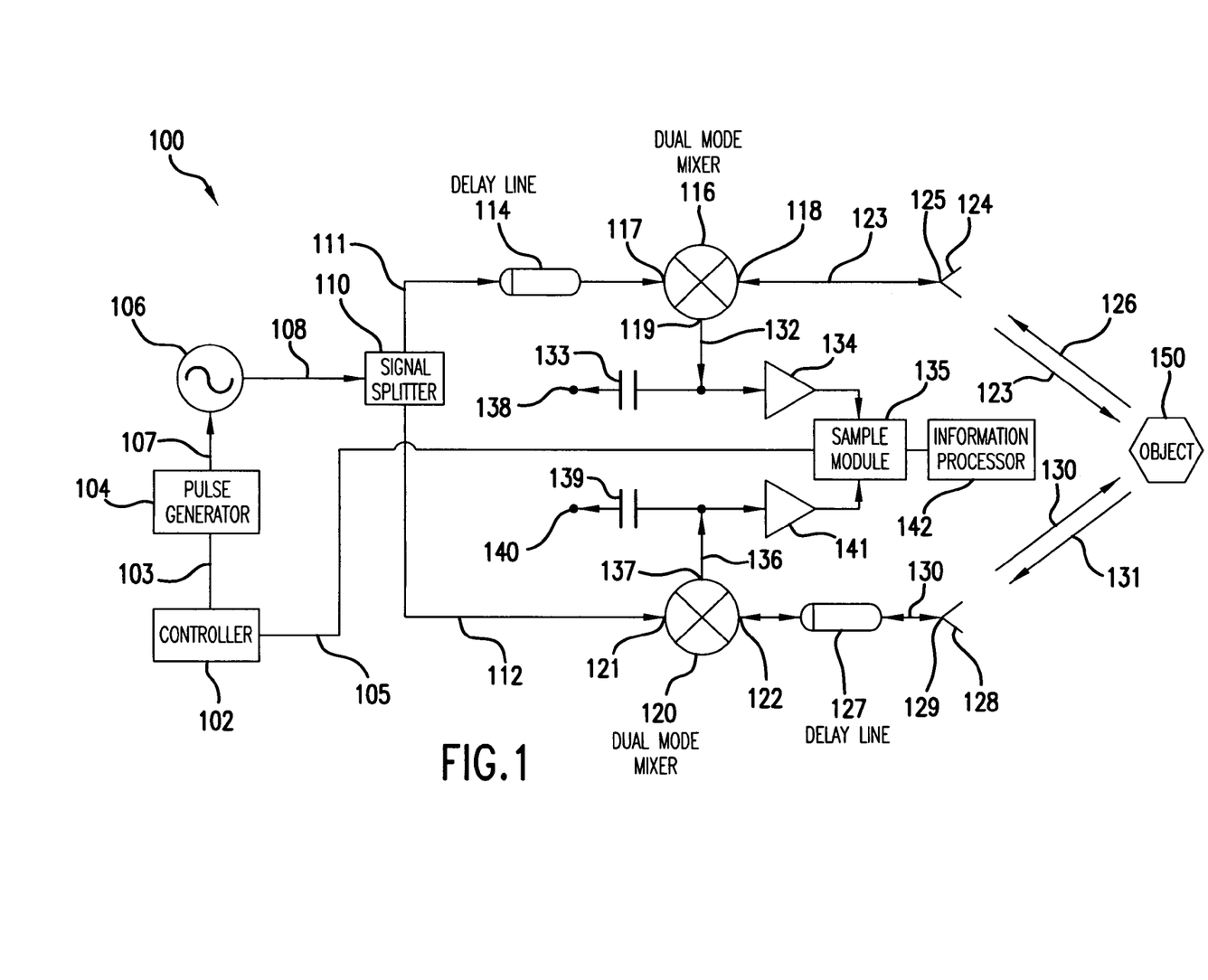
FIG. 1 is a block diagram of an embodiment of a sensor front end for velocity measurement and bearing determination.

FIG. 1 depicts a preferred embodiment of the basic architecture and operation of a sensor system, and FIGS. 3A, 3B, 3C, and 4 depict exemplary circuits that are suitable for use within the embodiment depicted in FIG. 1.

In this embodiment, a sensor front end 100 includes a first signal source which, in a preferred embodiment, includes a controller 102 that generates a plurality of control pulses, including a transmit trigger signal 103 and a sample and hold pulse signal 105. A pulse generator 104 receives the transmit trigger signal 103 and provides a gating function "on" pulse signal 107 preferably having a predetermined pulse width, to a pulse oscillator 106. Preferably, the frequency of the pulse oscillator 106 is between about 20–30 GHz. In one embodiment, the pulse oscillator is a voltage-controlled oscillator. The pulse oscillator 106 is responsive to the gating function "on" pulse signal 107 and provides a pulsed signal 108 for the time that the "on" pulse is active, i.e., for the predetermined pulse duration. In a preferred embodiment, the pulsed signal 108 is pulse-coded to avoid false radar return signals. The predetermined pulse duration of the pulsed signal 108 is, preferably, greater than zero and less than about 66 nanoseconds and, most preferably is about 33.33 nanoseconds. During the time that the "on" pulse is active, the pulsed signal 108 provided by the pulsed oscillator 106 includes a first frequency, a first amplitude and a first phase. In a preferred embodiment, the transmit trigger signal 103 is provided with a predetermined pulse repetition frequency, which initiates subsequent trigger pulse signals according to the frequency.

The sensor system 100 also preferably includes a phase shifter component, which in a preferred embodiment, includes a signal splitter 110 that receives the pulsed signal 108 and transforms it into a first signal 111 and a second signal 112. The first signal 111 and the second signal 112 are preferably, but not necessarily, of substantially equal power. An example of a signal splitter 110 contemplated by the invention is a passive Wilkinson power divider, although not limited thereto. A first phase shifter is coupled between the signal splitter 110 and a first dual mode mixer 116. Preferably, the first phase shifter is fixed and, more preferably, as depicted in FIG. 1, is a first 45° delay line 114. The first 45° delay line 114 receives the first signal 111 from the signal splitter 110 and shifts the phase of the first signal 111 by 45°. The first dual mode mixer 116 receives the phase shifted first signal 113 at a first input port 117. A second dual mode mixer 120 is coupled to the signal splitter 110 and receives the second 112 signal at a second input port 121.

The first dual mode mixer 116 provides a predetermined amount of signal transmission between the first input port 117 and a first input/output port 118. Thus, a first portion of the phase shifted first signal 113 (a first sensor signal 123), is passed through the first dual mode mixer 116 and is provided as an output at the first input/output port 118. The first input/output port 118 is coupled directly to a first antenna 124 via a first antenna port 125. The first antenna 124 is a transmitting and receiving antenna, typically having a common aperture for both transmitting the first sensor signal 123 and receiving a first reflected signal 126 that has been reflected from an object 150.

The second dual mode mixer 120 provides a predetermined amount of signal transmission between the second input port 121 and a second input/output port 122. Thus, a first portion of the second signal is passed through the second dual mode mixer 120 and is provided as an output at the second input/output port 122. A second phase shifter is connected in series between the second input/output port 122 and a second antenna 128 via a second antenna port 129. Preferably, the second phase shifter is fixed and is a second 45° delay line 127, as depicted in FIG. 1. The second 45° delay line 127 shifts the phase of the portion of the second signal 112 that passed through mixer 120, to form a second sensor signal 130. The second antenna 128 is a transmitting and receiving antenna, typically having a common aperture for both transmitting the second sensor signal 130 and receiving a second reflected signal 131 that has been reflected from the object 150. Preferably, the distance between the aperture of the first antenna 124 and the aperture of the second antenna 128 is not greater than about one half of the wavelength of the pulsed signal 108.

When the object 150 is present within the beam width of the first antenna 124 and the second antenna 128, a portion of the first sensor signal 123 and a portion of the second sensor signal 130 are reflected from the object 150. The first antenna 124 captures the first reflected signal 126. The second antenna 128 captures the second reflected signal 131. The first dual mode mixer 116 receives the first reflected signal 126 from the first antenna 124 at the first input/output port 118, and mixes it with a portion of the phase shifted first signal 113 provided by the signal splitter 110 and delay line 114. Accordingly, since the duration of the phase shifted first signal 113 is equal to the pulse duration of the gated function "on" pulse signal 107, mixing of the first reflected signal 126 and the portion of the phase shifted first signal 113—can only occur during the time that the pulse generator 104 provides the gated function "on" pulse 107 to the pulsed oscillator 106.

Regarding the second reflected signal 131, in the embodiment depicted in FIG. 1, the second 45° delay line 127 shifts the phase of the second reflected signal 131 received from the second antenna 128 by 45°. The second dual mode mixer 120 receives the phase shifted second reflected signal 115 from the second 45° delay line 127 at the second input/output port 122 and mixes it with a portion of the second signal 112 provided by the signal splitter 110. Accordingly, since the duration of the second signal 112 is equal to the pulse duration of the gated function "on" pulse 107, mixing of the phase shifted second reflected signal 115 and the second portion of the second signal 112 can only occur during the time that the pulse generator 104 provides the gated function "on" pulse signal 107 to the pulsed oscillator 106.

Therefore, the object 150 may be detected only if-either reflected signal 126, 131 is received and down converted during the time that the pulse generator 104 provides the gated function "on" pulse 107 to the pulsed oscillator 106. As explained above with respect to the architecture depicted in FIG. 1, this will inherently allow objects to be discerned based on their range from either the first antenna 124 or the second antenna 128. Only objects that have a range (the distance which the sensor signal and the reflected signal travel) that is less than the predetermined pulse width of the gate function "on" signal will be detected. The relationship between the detection range and the predetermined pulse width of the gate function "on" pulse signal is noted in Eq. 1 below. Objects that are outside this range will not be properly detected; that is, false radar returns from earlier transmitted signals will not indicate real objects.

Thus the detection range may be determined by the equation:

$$R_d \le \frac{c}{2} * \tau_w \qquad \text{Eq. 1}$$

where c is the speed of light and $\tau_w$ is the predetermined pulse width of the gate function "on" signal pulse. Objects that are outside this range will not be detected.

The first dual mode mixer 116 provides a signal (a first mixed reflected signal 132) obtained from the mixing operation of a portion of the phase shifted first signal and the first reflected signal 126 as an output from a first output port 119. Similarly, the second dual mode mixer 120 provides a signal (a second mixed reflected signal 136) obtained from the mixing operation of the portion of the second signal 112 and the phase shifted second reflected signal as an output from a second output port 137. Preferably, both the first dual mode mixer 116 and the second dual mode mixer 120 provide low isolation between their respective input port and output port.

In one embodiment, the phase shifter is preferably coupled to a receiver component. Preferably, the receiver has a first hold capacitor 133 connected between the first output port 119 and a first voltage reference node 138. The first hold capacitor 133 receives the first mixed reflected signal 132 that is provided during the duration of the gate function "on" pulse 107. A first preamplifier 134 is coupled to the first hold capacitor 133 such that the same signal on the first hold capacitor 133 is amplified by the first preamplifier 134 and is then provided to a sample module 135. A second hold capacitor 139 is connected between the second output port 137 and a second voltage reference node 140. The second hold capacitor 133 receives the mixed second reflected signal 136 that is provided during the duration of the gate function "on" pulse 107. A second preamplifier 141 is coupled to the second hold capacitor 139 such that the same signal on the second hold capacitor 139 is amplified by the second preamplifier 141 and is then provided to the sample module 135. Amplification of the mixed first reflected signal 132 and the second mixed reflected signal 136 is preferable, but not required.

Figure 5:
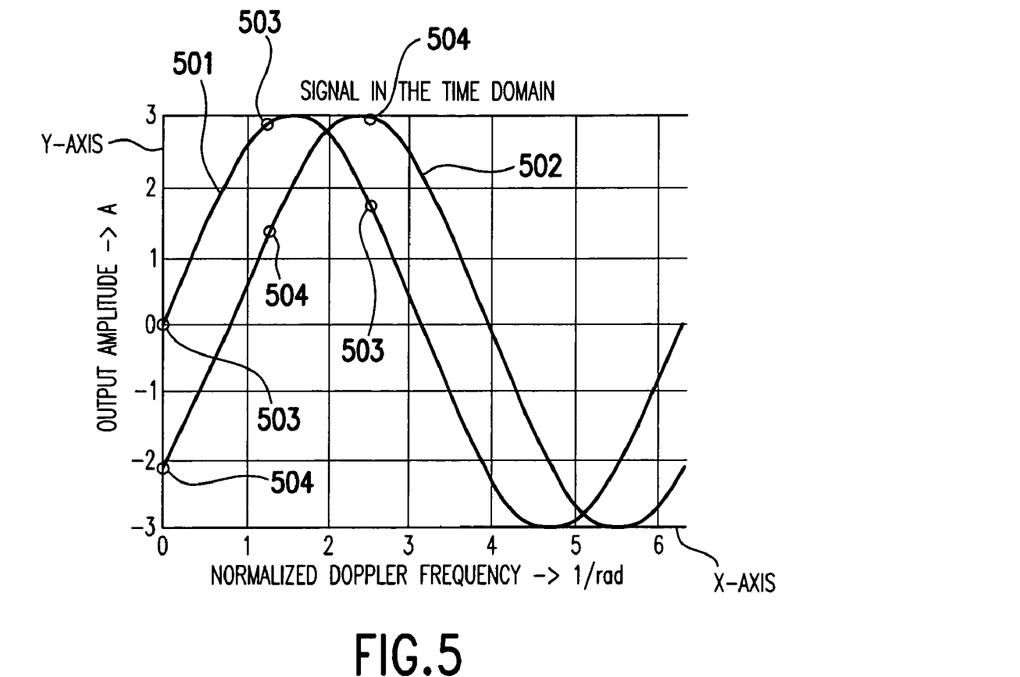
FIG. 5 is a graph depicting the Doppler-Sine of two exemplary sampled output signals according to an embodiment of the invention.

The signal sampler 135 receives the sample and hold pulse signal 105 from the controller 102, and provides a first sampled output signal 501 that is representative of the output of the first preamplifier 134, and a second sampled output signal 502 that is representative of the output of the second preamplifier 141, at the time of the sample and hold pulse signal 105, as shown in FIG. 5. In preferred embodiments of the invention, for example, these output signals are converted to digital signals using an analog-to-digital converter. The first sampled output signal 501, in embodiments of the invention, may be based on the first mixed reflected signal 132, or a portion thereof, and the second sampled output signal 502 may be based on the second mixed reflected signal 136, or a portion thereof. Preferably, an information processor 142 in communication with sampler 135, receives and/or processes these sampled output signals, as further described below. The information processor 142 is programmed to recover bearing information, as described below. Information processor 142 may also be programmed to recover velocity information for the object 150 using the methods described herein, for example, Fast Fourier Transform (FFT) algorithms.

The processor 142 recovers object bearing information for object 150 according to the phase difference between the first mixed reflected signal 132 and the second mixed reflected signal 136. In the embodiment depicted in FIG. 1, the first 45° delay line 114 and the second 45° delay line 127 create a phase difference of 90° (quadrature) between the first mixed reflected signal 132 and the second mixed reflected signal 136 for an object 150 approaching from bore-sight. According to the invention, as an object moves away from bore-sight, the phase difference between the two mixed reflected signals will change and be non-ambiguous for any bearing angle if the distance between the first antenna 124 and the second antenna 128 is less than one half the wavelength of the pulsed signal 108. In a preferred embodiment, bearing information is derived by processing sample points from the first sampled output signal 501 and the second sampled output signal 502, as described below.

Figure 2:
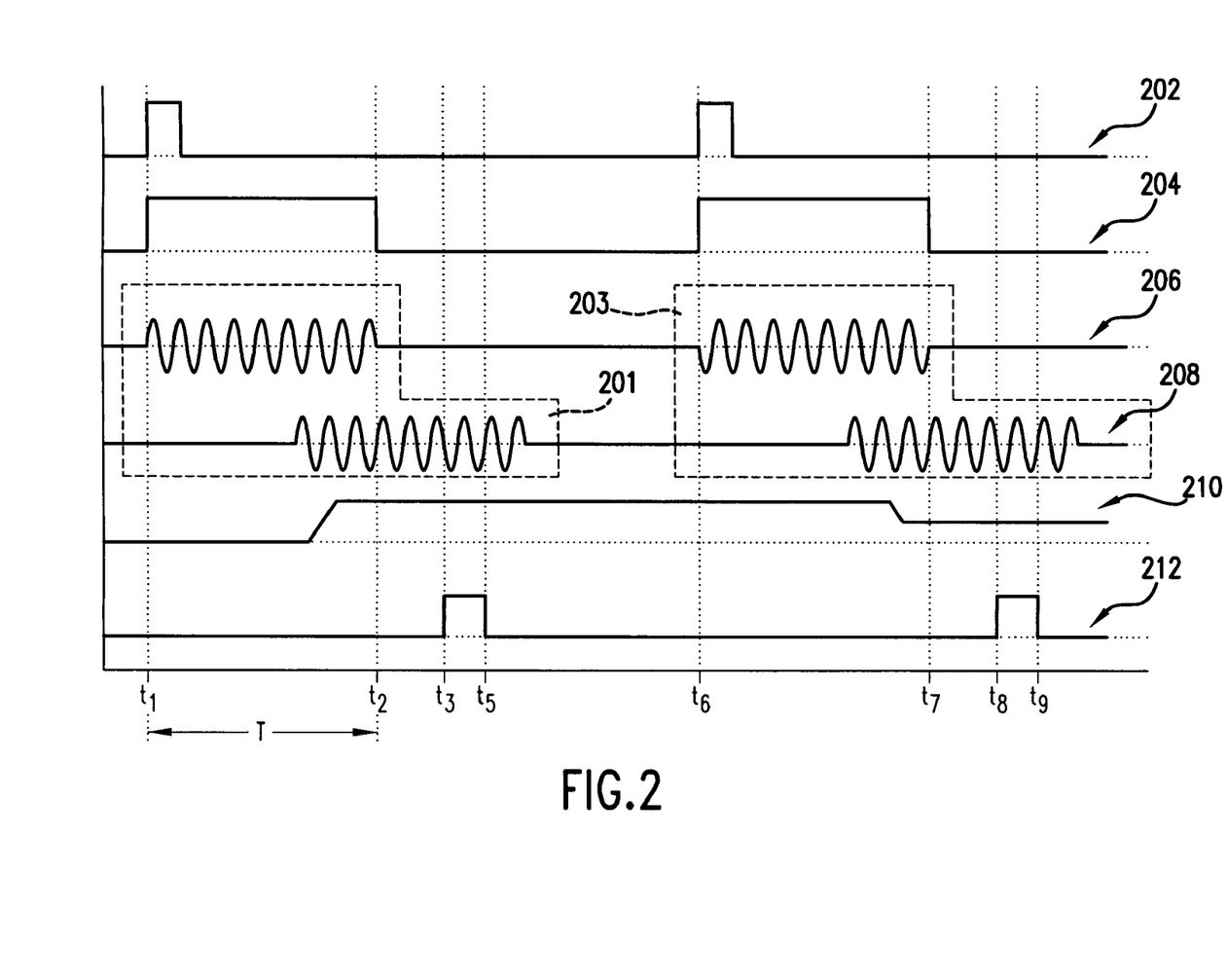
FIG. 2 is a timing diagram of various waveforms used in the embodiment depicted in FIG. 1.

FIG. 2 depicts a variety of waveforms that illustrate the operation of the sensor front end 100 depicted in FIG. 1. In particular, one waveform 202 represents the transmit trigger signal 103 provided by controller 102. In the waveform 202, the rising edge of the transmit trigger signal 103 is provided at $t_1$ to the pulse generator 104. Another waveform 204 represents the pulse generator gate function "on" pulse signal 107 having a predetermined pulse width "T." The pulse oscillator 106 receives the pulse signal 107 and provides the first signal that is oscillating at the first frequency, has the first phase, and has the first amplitude for the duration of the predetermined signal (pulse) width, as illustrated in waveform 206. If an object 150 is within the beam width of the antennas 124 and 128, energy will be reflected therefrom and received as reflected signals 126 and 131, respectively, that are attenuated and time-delayed from the sensor signal, as illustrated in waveform 208. These received reflected signals are down converted by the dual mode mixers 116 and 120 into a base-band signal (e.g., a video signal, although not limited thereto) as depicted in waveform 210. The controller 102 provides a sample and hold pulse 105 as illustrated in waveform 212 to sample the base-band signals prior to the next pulse being generated. Alternatively, if a single pulse does not contain sufficient energy to charge the holding capacitor, several pulses may be received prior to the sample trigger pulse being provided to ensure that the holding capacitor has a sufficiently large charge to allow for proper operation.

In one embodiment that may be used with an automobile sensing system, various system parameters such as the transmitter pulse width, the pulse repetition frequency, the hold capacitance, the video bandwidth, and I and Q sample time will be discussed. For one embodiment of an automobile system, Table 1 contains possible measurement requirements for a seatbelt pre-tensioning system.

TABLE 1

| Parameter | Requirement |
| --- | --- |
| Range: | $0 \le R \le 5.0$ meters |
| Velocity: | $0 \le R \le 200$ km/hr |
| Velocity Accuracy: | 5.0%, maximum |
| Data Acquisition Time: | 1.0 msec, maximum |

At a closing rate of 200 km/hr, the range change in 1.0 millisecond is 0.055 meters, and the time to impact is 0.09 seconds. The pulse modulator gate function "on" pulse width for a maximum detection range of 5 meters is 33.33 nanoseconds.

The velocity measurement limit is determined by the ability to acquire and process the position vector data within the data acquisition time of 1 millisecond. To ensure the detection of objects at the maximum detection range of 5 meters the pulse width must be extended so that a sufficient time overlap occurs between the transmitted and received signals. For a video bandwidth that is sufficiently broad, i.e., capable of charging the hold capacitance during a single pulse repetition frequency cycle, the position vector data may be obtained in four cycles of the pulse repetition frequency. An object at a range of 5 meters will produce a 17 nanosecond overlap and as such the video bandwidth (neglecting delay) may be shown to be 23 MHz. If the pulse repetition frequency is 1 MHz, the required time for the acquisition of the position vector data is 4 microseconds.

To determine the Doppler frequency unambiguously, since the maximum change in the two way phase is $2\pi$ radians, for a data acquisition period of 4 microseconds, the maximum velocity is 1554 m/sec. It is unlikely that such a high velocity will be encountered in an automotive system. A tradeoff can be made between reducing the bandwidth to facilitate a greater probability of detection and the measurement accuracy. Thus, for a maximum velocity of 250 km/hr, the minimum acquisition time is approximately 90 microseconds. Therefore, at a pulse repetition frequency of 1 MHz approximately 20 samples could be utilized for each of the four components of the two position vectors, or the video band may be reduced by a factor of 20 with respect to the single pulse acquisition. Further, the radar range equation may be used to approximate the operational detection range under the following parametric conditions:

$$R_{max} = \sqrt[4]{\left(\frac{P_t G_t G_r \lambda^2 \sigma}{(4\pi)^3 F_s k T B_n \alpha}\right)} \quad \text{Eq. 2}$$

where $P_t$ is the transmitter power (e.g., 0.001 Watts), $G_t$ is the transmit antenna gain (e.g., 10), $G_r$ is the receive antenna gain (e.g., 10), $\lambda$ is the operating wavelength (e.g., 0.0124 meters), $F_s$ is the front end noise figure (e.g., 10), $\sigma$ is the object radar cross section (e.g., 5 square meters), T is the absolute temperature in Kelvins (e.g., 300° K.), k is Boltzmann's constant ($1.38*10^{-23}$ J/K), $\alpha$ is the desired detection signal to noise ratio (e.g., 30), and $B_n$ is the system noise bandwidth (e.g., 5.0 MHz). For these exemplary system parameters Eq. 6 shows an operational detection range of approximately 8.8 meters, and a signal to noise ratio of approximately 24.7 dB at 5.0 meters.

Figure 3A:
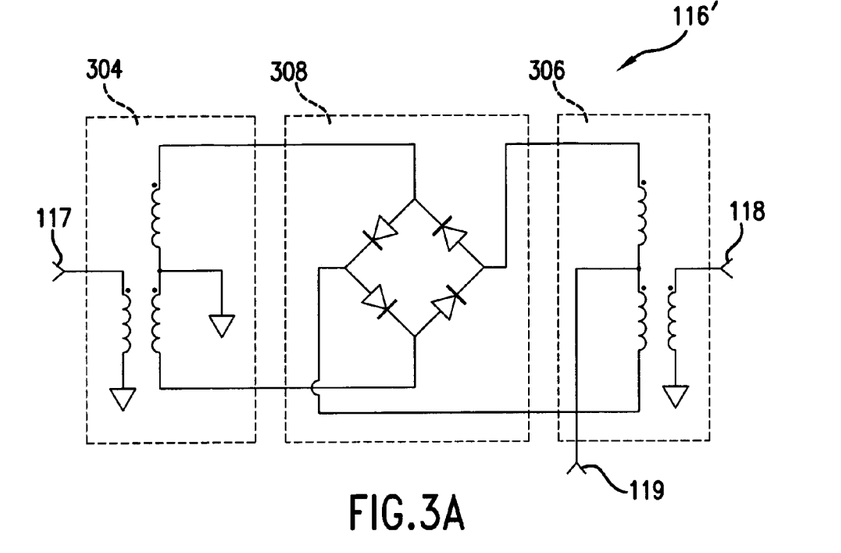
FIG. 3A is one embodiment of a mixer suitable for use in the present invention.
Figure 3B:
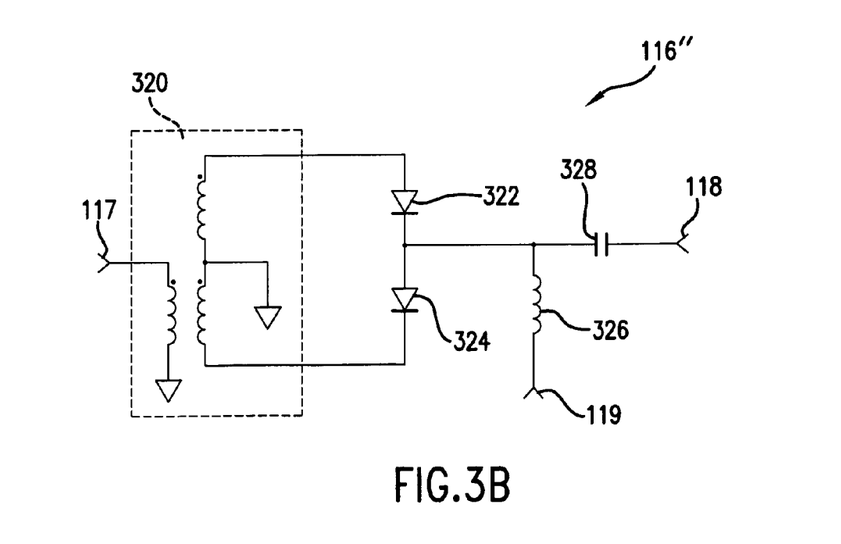
FIG. 3B is another embodiment of a mixer suitable for use in the present invention.
Figure 3C:
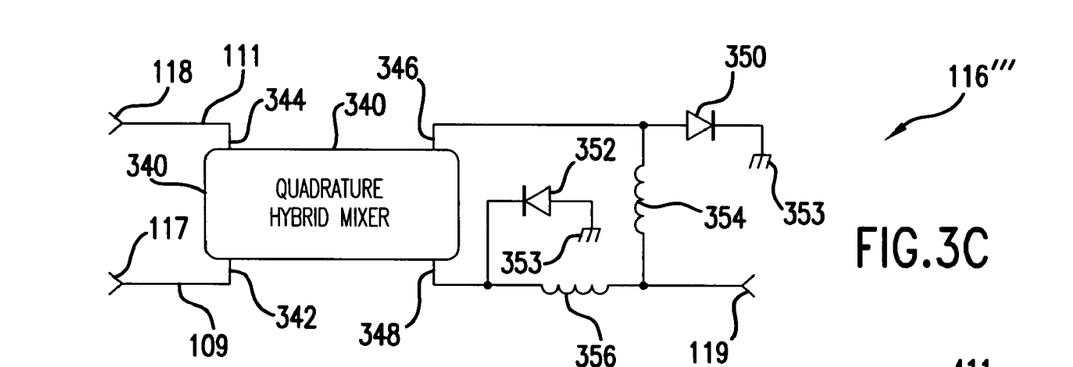
FIG. 3C is another embodiment of a mixer suitable for use in the present invention.

FIGS. 3A, 3B, and 3C depict three exemplary embodiments of dual mode mixers that are suitable for use in the sensor front end 100 depicted in FIG. 1. FIG. 3A is a double balanced mixer ("DBM") 116' that includes first and second baluns 304 and 306 respectively and a quad diode ring 308.

FIG. 3B depicts another embodiment of a dual mode mixer suitable for use in the sensor front end depicted in FIG. 1. Mixer 116" is a single balanced mixer; The single balanced mixer 116" has intrinsic isolation between the first input port 117 and the first input/output port 118 by the null associated with the bipolar drive signal, from balun 320, across diodes 322 and 324. Inductor 326 is provided to prevent RF energy from the first input/output port 118 from entering the first output port 119. Capacitor 328 is added to prevent the down-converted base-band video signal from transmitting through the first input/output port 118.

FIG. 3C depicts a quadarature hybrid mixer 116''' that can act as a dual mode mixer suitable for use in the sensor front end depicted in FIG. 1. Quadrature hybrid mixers are devices that divide an input signal at one terminal into two signals that are output on the terminals on the opposite side of the hybrid. The two output signals typically have one-half the power of the input signal and are ninety (90) degrees out of phase with one another. Any port may be used as the input port, with the other ports responding according to the known properties of quadrature hybrid mixers. In this way, a quadrature hybrid mixer may be used to both transmit and receive signals, as described in more detail in the following paragraph.

As depicted in FIG. 3C the quadrature hybrid mixer 340 includes a first port 342, typically referred to as local oscillator input, that receives the first signal 109. The quadrature hybrid mixer 340 further includes a second port 344 that is coupled to the phase shifter 110 (not shown) and provides or receives signal 111 to and from the phase shifter 110 respectively. Ports 346 and 348 are coupled to mixer diodes 350 and 352 respectively that are coupled to ground 353. Ports 346 and 348 are further coupled, via inductors 354 and 356 respectively to signal the holding capacitor 114 (not shown) and provide a signal thereto.

Figure 4:
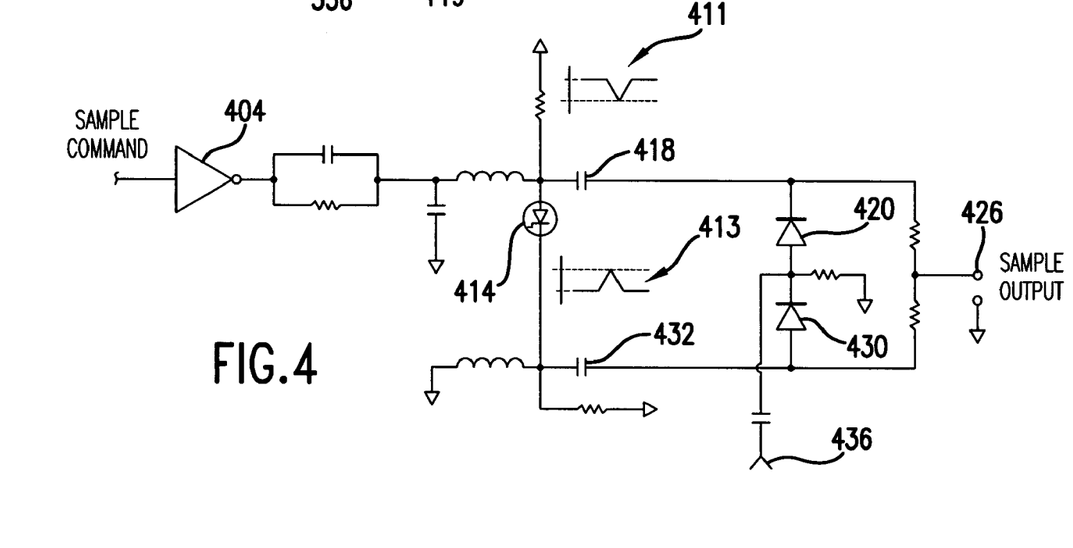
FIG. 4 is a schematic diagram of a sampler module suitable for use in the present invention.

FIG. 4 depicts a broad band sampling circuit suitable for use with the sensor front end depicted in FIG. 1. The circuit depicted in FIG. 4 utilizes high speed bi-polar sampling pulses 411 and 413 to rapidly turn on and off diodes 420 and 430 to sample the signal present at input 436 and provide a sampled output at node 426. A pulse generator suitable for generating the high speed sampling pulses 411 and 413 includes a step recovery diode (SRD) 414, which has a very rapid transition time, i.e., a SRD will rapidly switch from a conducting to a non-conducting state when a reverse bias is applied. As the drive signal from driver 404 falls, the SRD will switch off and the fast negative going pulse is provided to the capacitors 418 and 432 that will differentiate the negative going pulse and provide the pulses 411 and 413.

FIG. 5 is a graph depicting the Doppler-Sine of two exemplary sampled output signals according to the invention, such as for example, the first sampled output signal 501 and the second sampled output signal 502 discussed above in reference to FIG. 1. The x-axis of the graph is the normalized Doppler Frequency, represented as "1/rad", and the y-axis is the output amplitude represented as "A". In the example depicted in FIG. 5, the amplitude of both output signals are equal and both output signals are offset-free.

According to an embodiment of the invention, both the first sampled output signal 501 and the second sampled output signal 502 are sampled a predetermined number of times with a constant sampling frequency to collect sample points from the signals. A set of first sampled points 503 are collected from the first sampled output signal 501 and a set of second sampled points 504 are collected from the second sampled output signal 502. Preferably, the predetermined number of points in each set is at least three. Each sampled point may be found using the equations:

$$x_n = A \cdot \sin(\omega_n)$$

$$y_n = A \cdot \sin(\omega_n + \Delta\phi) \quad \text{Eq. 3}$$

where $x_n$ represents an X-coordinate of a sample point n of the first sampled output signal 501, $y_n$ represents a Y-coordinate of a sample point n of the second sampled output signal 502, A is the amplitude, $\omega_n$ is angular frequency of the sample point n, and $\Delta\phi$ is phase difference between the signals.

Figure 6:
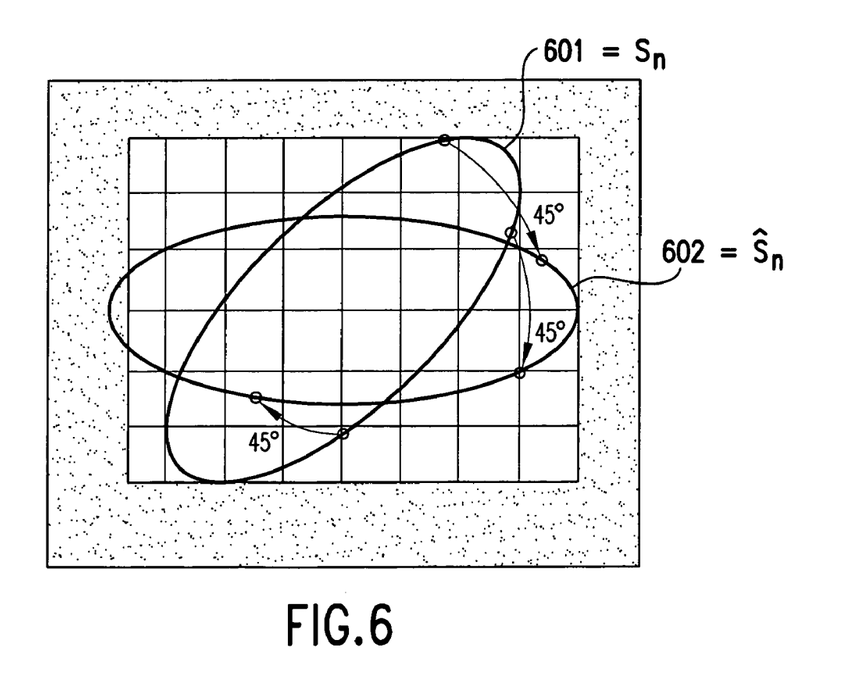
FIG. 6 is a graph of three discreet samples $S_n$, and the rotated discrete samples $\acute{S}_n$, in the complex plane, that represent three exemplary sampled output signals, according to an embodiment of the invention.

A relationship between the set of first sample points 503 and the set of second sample points 504 can be defined by treating the sample points as complex numbers. For example, for discrete samples, $S_n$:

$$S_n = A \cdot \cos(\phi_n) + i \cdot A \cdot \sin(\phi_n + \Delta\phi) \qquad \text{Eq. 4}$$

with the real part of $S_n$, ($A \cdot \cos(\phi_n)$), representing the first sampled output signal 501, and the imaginary part, $i \cdot A \cdot \sin(\phi_n + \Delta\phi)$, representing the second sampled output signal 502. A graph of $S_n$ in the complex plane with the x-axis representing the real part of $S_n$ and the y-axis the imaginary part of $S_n$ is shown in FIG. 6.

As shown in the FIG. 6, samples $S_n$ represent points (the sample pairs: $x_n$, $y_n$) on an ellipse 601 having a real and imaginary component. For purposes of illustration, an amplitude of 3 has been chosen. However, it should be understood that, according to the invention, the amplitude is derived from the sampled points, as discussed in more detail below, and is not limited to any specific range of values. To solve the ellipse equation, the ellipse 601 is transformed by rotating it (in the embodiments disclosed herein this is 45°) around the origin of the Cartesian coordinate system to form the rotated ellipse 602. Rotating the ellipse does not change the shape of the ellipse 601 and therefore, no information that may be gleaned from ellipse 601 is lost.

On the rotated ellipse 602, the transformed samples are thus represented by the equation:

$$\tilde{S}_n = \sqrt{\tilde{x}_n^2 + \tilde{y}_n^2} \cdot e^{-i\left(\angle(x_n, y_n) - \frac{\pi}{4}\right)}, \qquad \text{Eq. 5}$$

which may be written as:

$$\tilde{S}_n = \tilde{x}_n + i \cdot \tilde{y}_n. \qquad \text{Eq. 6}$$

The rotated ellipse 602 may also be characterized through the general ellipse equation:

$$\frac{\tilde{x}^2}{a^2} + \frac{\tilde{y}^2}{b^2} = 1, \qquad \text{Eq. 7}$$

where the parameter 'a' is the semi-major axis (or base) of the rotated ellipse 602 and the parameter 'b' is the semi-minor axis of the rotated ellipse 602.

As noted above in connection with FIG. 5, the sampled output signals, such as the first sampled output signal 501 and the second sampled output signal 502 shown in FIG. 5, are sampled at a constant sampling frequency to create sample pairs. Accordingly, the phase change (delta) between each sample pair is constant, and thus:

$$\frac{(\tilde{x}_n - \tilde{x}_{n-1})^2}{a^2} + \frac{(\tilde{y}_n - \tilde{y}_{n-1})^2}{b^2} = \qquad \text{Eq. 8}$$
$$\frac{(\tilde{x}_{n-1} - \tilde{x}_{n-2})^2}{a^2} + \frac{(\tilde{y}_{n-1} - \tilde{y}_{n-2})^2}{b^2} = c,$$

where 'c' is a constant. This equation thus allows the amplitude delta to be calculated for each of the sample pairs if parameters 'a' and 'b' are determined.

According to embodiments of the invention, solving these equations for parameter 'a' and parameter 'b' will determine the speed and bearing information of the object. Thus, from Eq. 7 and 8 a linear system of equations may be set up to recover parameter 'a' and parameter 'b':

$$\begin{pmatrix} \tilde{x}_n^2 & \tilde{y}_n^2 & 0 \\ \Delta\tilde{x}_n^2 & \Delta\tilde{y}_n^2 & -1 \\ \Delta\tilde{x}_{n-1}^2 & \Delta\tilde{y}_{n-1}^2 & -1 \end{pmatrix} \cdot \begin{pmatrix} \frac{1}{a^2} \\ \frac{1}{b^2} \\ c \end{pmatrix} = \begin{pmatrix} 1 \\ 0 \\ 0 \end{pmatrix} \text{ with}$$

$$\Delta\tilde{x}_n^2 = (\tilde{x}_n - \tilde{x}_{n-1})^2$$

$$\Delta\tilde{y}_n^2 = (\tilde{y}_n - \tilde{y}_{n-1})^2$$

$$\Delta\tilde{x}_{n-1}^2 = (\tilde{x}_{n-1} - \tilde{x}_{n-2})^2$$

$$\Delta\tilde{y}_{n-1}^2 = (\tilde{y}_{n-1} - \tilde{y}_{n-2})^2$$

When an object, such as the object 150 depicted in FIG. 1, is present, the matrix is solved, yielding values for the parameters a, b, and c. If parameter 'a' is equal to parameter 'b', information processor 142 provides an output that the bearing angle of the object 150 is about 90°. If parameter 'a' is less than parameter 'b', signal processor 142 provides an output that the bearing angle of object 150 is:

$$\theta = \arccos\left(\frac{a}{b}\right) \cdot \frac{180}{\pi}. \qquad \text{Eq. 9}$$

If parameter 'a' is greater than parameter 'b', signal processor 142 provides an output that the bearing angle of object 150 is:

$$\theta = \arccos\left(\frac{b}{a}\right) \cdot \frac{180}{\pi}. \qquad \text{Eq. 10}$$

Thus, in the case where parameter 'a' is less than parameter 'b', the object is at a bearing angle between 0° and 90°, and in the case where parameter 'a' is greater than parameter 'b', the object is at a bearing angle between 90° and 180°.

With the solution of the matrix, $\hat{S}_n$ may now be written as:

$$\hat{S}_n = a \cdot \cos(\varphi_n) + i \cdot b \cdot \sin(\varphi_n),\qquad \text{Eq. 11}$$

and object speed information may be derived, as described below.

Figure 7:
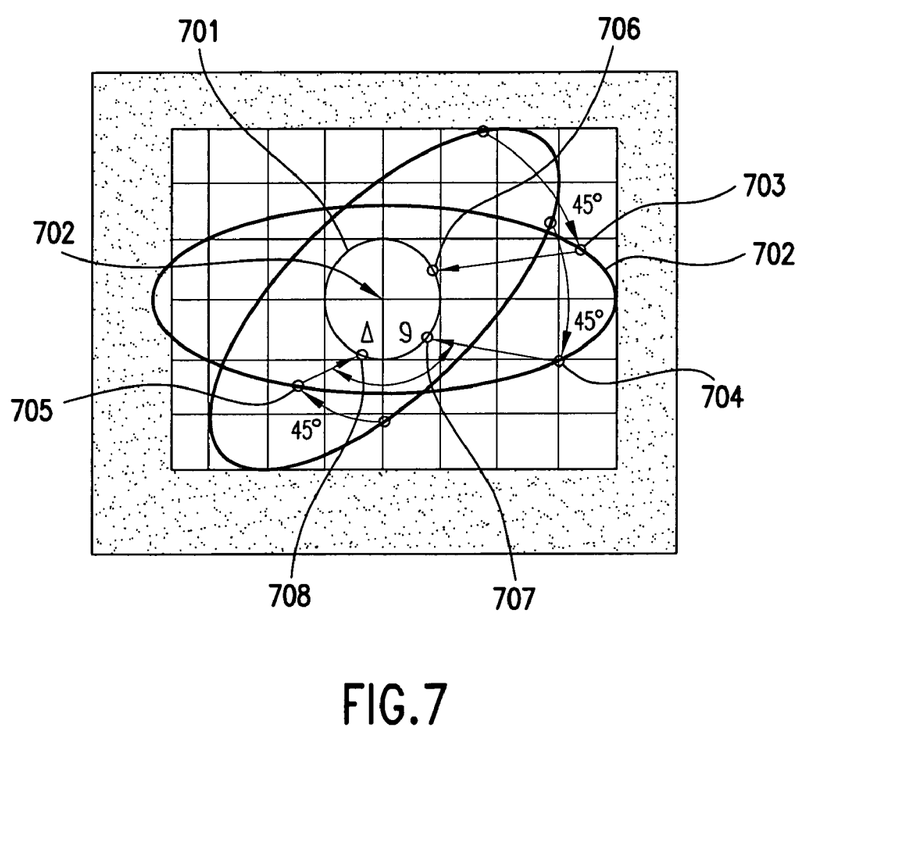
FIG. 7 is a graph showing the transformation of rotated discrete sample $\acute{S}_n$ onto a circle $C_n$ in the complex plane, according to an embodiment of the invention.

For example, referring now to FIG. 7, speed information can be derived through:

$$f_{Doppler} = \frac{\Delta\varphi}{\Delta t} \cdot T \qquad \text{Eq. 12}$$

by transforming the sampled values $$\hat{S}_n$$

from the rotated ellipse 602 onto a circle 601 having a center 702 in common with the center of the rotated ellipse 602. The circle 701 represents a special case of $$\hat{S}_n$$

where parameter a is equal to parameter b. Since the ellipse parameters a, b, and c have been determined, the sampled values $\hat{S}_1$ 703, $\hat{S}_2$ 704, and $\hat{S}_3$ 705 may be transformed onto circle 701 according to the following equation:

$$C_n = \frac{\hat{x}_n}{a} + i \cdot \frac{\hat{y}_n}{b} = 1 \cdot e^{-i \cdot \arctan(\vartheta)} \qquad \text{Eq.13}$$

FIG. 7 shows an exemplary embodiment where sampled values $\hat{S}_1$ 703, $\hat{S}_2$ 704, and $\hat{S}_3$ 705 are transferred onto circle 701 at $C_1$ 706, $C_2$ 707, and $C_3$ 708, respectively, according to Eq. 13. Once transformed, the phase difference between $C_1$ and $C_2$, written as $\Delta\theta_{C2-C1}$, for example, may be determined. With the phase difference known, the speed information of the object may be extracted directly from:

$$f_{Doppler} = \frac{\Delta\vartheta}{\Delta t} \qquad \text{Eq. 14}$$

and $$v_r = \lambda \cdot \frac{f_{Doppler}}{2} = \frac{\lambda}{2} \cdot \frac{\Delta\vartheta}{\Delta t} \qquad \text{Eq. 15}$$

In preferred embodiments, a second phase difference between $C_2$ and $C_3$ written as $\Delta\theta_{C3-C2}$, may be calculated to derive a second speed information. In such embodiments, a mean value of the first speed information and the second speed information is calculated and is provided as an output representing the speed of the object. It should be understood that the invention contemplates processing any number of points $\hat{S}_n$ to derive mean speed information according to the above-equations.

Those of ordinary skill in the art should further appreciate that variations to and modification of the above-described methods and apparatus for a sensor front end, including but not limited to wireless communication between and among any of the components referred to herein or equivalent. For example, other applications that may be used with this system include a perimeter security system and an electronic fence. Accordingly, the invention should be viewed as limited solely by the scope and spirit of the appended claims.

While the invention has been described by illustrative embodiments, additional advantages and modifications will occur to those skilled in the art. Therefore, the invention in its broader aspects is not limited to specific details shown and described herein. Modifications, for example, to type and number of antenna, controllers, signal splitters, phase shifters, and sample points may be made without departing from the spirit and scope of the invention. Accordingly, it is intended that the invention not be limited to the specific illustrative embodiments, but be interpreted within the full spirit and scope of the appended claims and their equivalents.

What is claimed is:

1. A sensor system for detecting an object comprising:
   a signal source comprising:
   at least first and second antennas, each for transmitting sensor signal pulses toward an object and for receiving reflected signal pulses therefrom;
   means for phase delaying the transmitted signal pulses prior to their transmission; and
   means for generating information signals based on transmitted and reflected signal pulses; and
   an information processor programmed to receive the information signals and to determine bearing information for said object based on a phase difference between an information signal corresponding to the at least first antenna and an information signal corresponding to the at least second antenna.

2. The sensor system of claim 1, wherein said information processor is further programmed to determine velocity and direction information for said object.

3. The sensor system of claim 1, wherein said signal source comprises:
   a pulse source for providing the sensor signal pulses; and
   wherein the means for generating information signals is an information signal generator configured to generate information signals corresponding to a particular one of the at least first and second antennas if a portion of a sensor signal pulse and a reflected signal pulse of the particular antenna are present concurrently in said information signal generator.

4. The sensor system of claim 3, wherein the pulse source comprises an oscillator coupled to a pulse generator, said pulse generator configured to generate a pulse having a pulse length equal to a predetermined pulse duration, and said pulse generator pulsing a bias of the oscillator to provide the pulsed signal to the phase delaying means.

5. The sensor system of claim 4 wherein said oscillator is a voltage controlled oscillator.

6. The sensor system of claim 3, wherein the pulse source comprises an oscillator that generates an oscillator signal, a pulse generator that generates a pulsed signal having a pulse length equal to the predetermined pulse duration, and a radio frequency (RF) switch coupled to the oscillator and the pulse generator, the RF switch being responsive to the pulse generator and providing the pulsed signal to the phase delaying means.

7. The sensor system of claim 6, wherein the oscillator is a voltage controlled oscillator.

8. The sensor system of claim 3, wherein said information signal generator comprises at least one dual mode mixer configured to mix sensor signal pulses with corresponding reflected signal pulses.

9. The sensor system of claim 8, wherein said phase delaying means comprises:
at least one phase shifter for phase shifting a first sensor signal pulse by a first predetermined angle, and for phase shifting a second signal pulse and a second reflected signal pulse by a second predetermined angle, the first signal pulse being transmitted by the at least first antenna, and the second signal pulse and second reflected signal pulse being transmitted and received by the at least second antenna;
wherein a first information signal comprises the phase shifted first sensor signal pulse and a first reflected signal pulse; and a second information signal comprises the phase shifted second sensor signal pulse and the phase shifted second reflected signal pulse.

10. The sensor system of claim 9 wherein said phase shifter comprises a first delay line placed before a first dual mode mixer and a second delay line placed after a second dual mode mixer, said first and second delay line each introducing a phase delay of 45 degrees to a signal passing therethrough.

11. The sensor system of claim 8, wherein said information processor further comprises:
a first holding capacitor coupled between a first dual mode mixer and a first voltage reference node, wherein the first holding capacitor stores at least a portion of an information signal corresponding to the at least first antenna;
a second holding capacitor coupled between a second dual mode mixer and a second voltage reference node, wherein the second holding capacitor stores at least a portion of an information signal corresponding to the at least second antenna;
a preamplifier coupled to said first holding capacitor and said second holding capacitor and providing a first and second preamplified signal, from said first and second holding capacitors, respectively; and
a sampler coupled to said preamplifier for sampling said first and second preamplified signals thereby generating a first and second set of sample points therefrom.

12. The sensor system of claim 3, wherein the at least first and second antennas each have an aperture separated by a distance not greater than one half of a wavelength of a pulsed signal.

13. The sensor system of claim 1, wherein said transmitted sensor signals pulses are in-phase with each other and wherein information signals corresponding to the at least first antenna and information signals corresponding to the at least second antenna are in quadrature with each other.

14. The sensor system of claim 1, wherein said information processor comprises a signal sampling circuit for sampling information signals to provide a plurality of sample points; and a microprocessor programmed to calculate said bearing information from said sample points.

15. The sensor system of claim 14, wherein a first information signal corresponding to the at least first antenna is sampled to create a first set of sample points and a second information signal corresponding to the at least second antenna is sampled to create a second set of sample points, and wherein said microprocessor is programmed to:
perform coordinate transformation of said first and second set of sample points, wherein said transformed first and second set of sample points define part of an ellipse, said ellipse having bases a and b;
calculate amplitude delta of said transformed first and second sets of sample points to create a first and second set of delta coordinates for said ellipse;
solve a linear system of equations for said bases a and b; and
calculate said bearing information for said object using said bases a and b.

16. The sensor system of claim 15, wherein said microprocessor is further programmed to:
transform sample pairs formed from said first and second set of sample points to define a circle;
calculate a phase difference between said transformed sample pairs; and
calculate speed of said object with said phase differences.

17. A method for calculating bearing information for an object, the method comprising the steps of:
transmitting at least a first and second sensor signal pulse from at least a first and second antenna, respectively, toward said object;
receiving a first and second reflected signal pulse therefrom;
generating a first and second information signal from said first and second reflected signal pulse, said information signals being based on a mix of transmitted sensor signal pulses and reflected signal pulses; and
determining bearing information for said object based on a phase difference between said first and second information signal.

18. A method for calculating bearing information for an object comprising the steps of:
transmitting sensor signal pulses from at least first and second antennas toward an object;
receiving signal pulses reflected from the object via said at least first and second antennas;
generating a first information signal based on reflected signal pulses received on the at least first antenna and generating a second information signal based on reflected signal pulses received on the at least second antenna;
generating a first and second set of sample points from said first and second information signals, respectively;
performing coordinate transformation of said first and second set of sample points, wherein said transformed first and second set of sample points define part of an ellipse, said ellipse having bases a and b;
calculating amplitude delta of said transformed first and second sets of sample points to create a first and second set of delta coordinates for said ellipse; and
solving a linear system of equations to determine values for the bases a and b using said delta coordinates; wherein if base a is less than base b, the object is at a bearing angle between 0° and 90°, and wherein if base a is greater than base b, the object is at a bearing angle between 90° and 180°.

19. The method of claim 18, further comprising the steps of:
transforming sample pairs formed from said first and second set of sample points to define a circle;

calculating a phase difference between said transformed sample pairs; and calculating speed of said object with said phase differences.

20. A sensor system for detecting an object comprising:
a signal source comprising:
  a pulse source for providing at least a first and a second sensor signal pulse, said pulse source comprising at least one phase shifter to phase shift the first sensor signal pulse by a first predetermined angle, and to phase shift the second sensor signal pulse and a second reflected signal pulse by a second predetermined angle;
  at least a first antenna for transmitting said first sensor signal pulse toward an object and a second antenna for transmitting said second sensor signal pulse toward the object, wherein said first antenna is adapted to receive a first reflected signal pulse from the object, and said second antenna is adapted to receive a second reflected signal from the object; and
  an information signal generator comprising at least first and second dual mode mixers for generating a first information signal by mixing the first sensor signal pulse with the first reflected signal pulse if a portion of the first signal pulse and the first reflected signal pulse are present concurrently in the information signal generator, and for generating a second information signal by mixing the second sensor signal pulse with the second reflected signal pulse if a portion of the second signal pulse and the second reflected signal pulse are present concurrently in the information signal generator, said first sensor signal pulse, said second sensor signal pulse, and said second reflected signal pulse all being phase shifted; and
an information processor programmed to receive the first and second information signals from information signal generator and to determine bearing information for the object based on a phase difference between the first and second information signal;
wherein the phase shifter comprises a first delay line placed before the first dual mode mixer and a second delay line placed after said second dual mode mixer, said first and second delay lines each introducing a phase delay of 45 degrees to a signal passing therethrough.

21. A sensor system for detecting an object comprising:
a signal source comprising:
  a pulse source for providing at least a first and a second sensor signal pulse;
  at least a first and a second antenna, each having an aperture separated by a distance not greater than one half of a wavelength of a pulsed signal, the first antenna for transmitting the first sensor signal pulse toward an object and the second antenna for transmitting the second sensor signal pulse toward the object, wherein said first antenna is adapted to receive a first reflected signal pulse from the object, and said second antenna is adapted to receive a second reflected signal from the object; and
  an information signal generator for generating a first information signal if a portion of the first signal pulse and the first reflected signal pulse are present concurrently in the information signal generator, and for generating a second information signal if a portion of the second signal pulse and the second reflected signal pulse are present concurrently in the information signal generator;
  and
an information processor programmed to receive the first and second information signals from information signal generator and to determine bearing information for the object based on a phase difference between the first and second information signals.

22. A sensor system for detecting an object comprising:
a signal source comprising:
  a pulse source for providing at least a first and a second sensor signal pulse;
  at least a first antenna for transmitting the first sensor signal pulse toward an object and a second antenna for transmitting the second sensor signal pulse toward the object, wherein said first antenna is adapted to receive a first reflected signal pulse from the object, and said second antenna is adapted to receive a second reflected signal from the object; and
  an information signal generator comprising at least one dual mode mixer for generating a first information signal by mixing the first sensor signal pulse with the first reflected signal pulse if a portion of the first signal pulse and the first reflected signal pulse are present concurrently in the information signal generator, and for generating a second information signal by mixing the second sensor signal pulse with the second reflected signal pulse if a portion of the second signal pulse and the second reflected signal pulse are present concurrently in the information signal generator;
  and
an information processor programmed to receive the first and second information signals from information signal generator and to determine bearing information for the object based on a phase difference between the first and second information signal, said information processor comprising:
  a first holding capacitor coupled between a first dual mode mixer and a first voltage reference node, wherein the first holding capacitor stores at least a portion of said first information signal;
  a second holding capacitor coupled between a second dual mode mixer and a second voltage reference node, wherein the second holding capacitor stores at least a portion of said second information signal;
  a preamplifier coupled to said first holding capacitor and said second holding capacitor and providing a first and second preamplified signal, from said first and second holding capacitors, respectively; and
  a sampler coupled to said preamplifier to sample said first and second preamplified signal to generate first and second set of sample points therefrom.

* * * * *